(12) United States Patent
Liu et al.

(10) Patent No.: US 7,846,496 B2
(45) Date of Patent: Dec. 7, 2010

(54) MIXED MATRIX MEMBRANES INCORPORATING SURFACE-FUNCTIONALIZED MOLECULAR SIEVE NANOPARTICLES AND METHODS FOR MAKING THE SAME

(75) Inventors: Chunqing Liu, Schaumburg, IL (US); Stephen T. Wilson, Libertyville, IL (US); Beth McCulloch, Clarendon Hills, IL (US)

(73) Assignee: UOP LLC, Des Plains, IL (US)

( * ) Notice: Subject to any disclaimer, the term of this patent is extended or adjusted under 35 U.S.C. 154(b) by 897 days.

(21) Appl. No.: 11/679,121

(22) Filed: Feb. 26, 2007

(65) Prior Publication Data
US 2008/0039554 A1 Feb. 14, 2008

Related U.S. Application Data

(60) Provisional application No. 60/780,963, filed on Mar. 10, 2006.

(51) Int. Cl.
*B05D 5/00* (2006.01)
(52) U.S. Cl. .................. 427/244; 427/216; 427/271; 427/273; 427/535; 96/4
(58) Field of Classification Search .................. 427/244, 427/216, 271, 273, 535; 96/4
See application file for complete search history.

(56) References Cited

U.S. PATENT DOCUMENTS

| | | | |
|---|---|---|---|
| 3,567,632 A | 3/1971 | Richter et al. | |
| 4,230,463 A | 10/1980 | Henis et al. | |
| 4,705,540 A | 11/1987 | Hayes et al. | |
| 4,728,345 A | 3/1988 | Murphy | |
| 4,740,219 A | 4/1988 | Kulprathipanja et al. | |
| 4,880,442 A | 11/1989 | Hayes et al. | |
| 4,925,459 A | 5/1990 | Rojey et al. | |
| 4,925,562 A | 5/1990 | te Hennepe, et al. | |
| 4,968,430 A | 11/1990 | Hildenbrand et al. | |
| 5,085,676 A | 2/1992 | Ekiner et al. | |
| 5,104,532 A | 4/1992 | Thompson et al. | |
| 5,127,925 A | 7/1992 | Kulprathipanja et al. | |
| 5,288,304 A | 2/1994 | Koros et al. | |
| 5,431,864 A | 7/1995 | Rao et al. | |
| 5,447,559 A | 9/1995 | Rao et al. | |
| 5,507,856 A | 4/1996 | Rao et al. | |
| 5,538,536 A | 7/1996 | Fuentes et al. | |
| 5,935,646 A * | 8/1999 | Raman et al. ................ | 427/244 |
| 6,048,388 A | 4/2000 | Schwarz ................... | 106/31.27 |
| 6,248,682 B1 | 6/2001 | Thoompson et al. ........... | 502/4 |
| 6,500,233 B1 | 12/2002 | Miller et al. ................... | 95/50 |
| 6,503,295 B1 | 1/2003 | Koros et al. .................... | 95/51 |
| 6,508,860 B1 | 1/2003 | Kulkarni et al. ............... | 95/51 |
| 6,562,110 B2 | 5/2003 | Koros et al. ..................... | 96/4 |
| 6,579,343 B2 | 6/2003 | Brennecke et al. ............. | 95/51 |
| 6,585,802 B2 | 7/2003 | Koros et al. ..................... | 95/51 |
| 6,605,140 B2 | 8/2003 | Fuiver et al. ..................... | 96/4 |
| 6,626,980 B2 | 9/2003 | Hasse et al. ..................... | 95/51 |
| 6,663,805 B1 | 12/2003 | Ekiner et al. ............... | 264/45.9 |
| 6,726,744 B2 | 4/2004 | Kulprathipanja et al. ........ | 95/45 |
| 6,740,143 B2 | 5/2004 | Corbin et al. ................... | 96/11 |
| 6,755,900 B2 | 6/2004 | Koros et al. ..................... | 96/11 |
| 6,863,983 B2 | 3/2005 | Tsapatsis et al. ............ | 428/446 |
| 6,932,859 B2 | 8/2005 | Koros et al. ..................... | 96/10 |
| 6,946,015 B2 | 9/2005 | Jorgensen et al. ............... | 95/51 |
| 6,997,971 B1 | 2/2006 | Young et al. .................... | 95/45 |
| 7,025,804 B2 | 4/2006 | Simmons et al. ............... | 95/51 |
| 7,109,140 B2 | 9/2006 | Marand et al. .................. | 502/4 |
| 7,138,006 B2 | 11/2006 | Miller et al. .................... | 95/45 |
| 7,166,146 B2 | 1/2007 | Miller et al. .................... | 95/45 |
| 7,485,173 B1 * | 2/2009 | Liu et al. ........................ | 95/45 |
| 2002/0053284 A1 | 5/2002 | Koros et al. ..................... | 95/51 |
| 2002/0062737 A1 | 5/2002 | Guiver et al. ................... | 96/11 |
| 2002/0184939 A1 | 12/2002 | Yadav et al. ............... | 73/24.04 |
| 2003/0152759 A1 * | 8/2003 | Chao et al. ............... | 428/307.3 |
| 2003/0220188 A1 | 11/2003 | Marand et al. ................. | 592/60 |
| 2004/0047803 A1 | 3/2004 | Valtchev et al. ............. | 423/716 |
| 2004/0050249 A1 | 3/2004 | Corbin et al. ................... | 95/11 |
| 2004/0107830 A1 | 6/2004 | Simmons et al. ............... | 95/45 |
| 2004/0147796 A1 | 7/2004 | Roman et al. ................ | 585/144 |
| 2004/0167014 A1 * | 8/2004 | Yan et al. ..................... | 502/101 |
| 2005/0043167 A1 | 2/2005 | Miller et al. .................... | 502/4 |
| 2005/0139066 A1 | 6/2005 | Miller et al. .................... | 95/45 |
| 2005/0189291 A1 | 9/2005 | Sellergren et al. ........... | 210/490 |
| 2005/0230305 A1 | 10/2005 | Kulkarni et al. ......... | 210/500.23 |
| 2005/0268782 A1 | 12/2005 | Kulkarni et al. .................... | 96/4 |
| 2006/0107830 A1 | 5/2006 | Miller et al. .................... | 95/45 |
| 2006/0117949 A1 | 6/2006 | Kulkarni et al. ................ | 95/45 |
| 2007/0022877 A1 | 2/2007 | Marand et al. .................. | 95/51 |
| 2007/0184557 A1 * | 8/2007 | Crudden et al. ............. | 436/171 |

FOREIGN PATENT DOCUMENTS

| | | |
|---|---|---|
| EP | 1 188 477 A1 | 3/2002 |
| WO | WO 2007/007051 A1 | 1/2007 |
| WO | WO-2008/066939 A1 * | 6/2008 |
| WO | WO-2008/066939 A2 * | 6/2008 |

OTHER PUBLICATIONS

Vu et al., Journal of Membrane Science, vol. 211, pp. 311-334 (2003).
Moermans et al., Chem. Commun., pp. 2467-2468 (2000).*
Wang et al., Journal of Mater. Chem., vol. 12, pp. 3640-3643 (2002).*
Yong et al., Journal of Membrane Science, vol. 188, pp. 151-163 (2001).*

(Continued)

*Primary Examiner*—Peter D. Mulcahy
*Assistant Examiner*—Henry Hu
(74) *Attorney, Agent, or Firm*—Mark Goldberg

(57) ABSTRACT

Mixed matrix membranes that are capable of separation and purification of gas mixtures are disclosed. These membranes comprise polymers that include dispersed therein nanomolecular sieve particles. In a preferred embodiment, the nanomolecular sieve particles contain attached functional groups to prevent their agglomeration.

17 Claims, No Drawings

OTHER PUBLICATIONS

Smaihi et al., Journal of Mater. Chem., vol. 14, pp. 1347-1351 (2004).*
Yong et al., J. Membr. Sci., 188:151 (2001).
Moermans et al., Chem. Commun., 2467 (2000).
Yan et al., J. Mater. Chem., 12:3640 (2002).
Smaihi et al. J. Mater. Chem., 14:1347 (2004).
Wang et al., Chem. Commun., 2333 (2000).
Gautier et al., New J. Chem., 28:457 (2004).
Navrotsky, et al., Chem. Mater., 16:210 (2004).
J. Membr. Sci., 2003, 211, 311.

* cited by examiner

MIXED MATRIX MEMBRANES INCORPORATING SURFACE-FUNCTIONALIZED MOLECULAR SIEVE NANOPARTICLES AND METHODS FOR MAKING THE SAME

CROSS-REFERENCE TO RELATED APPLICATION

This application claims priority from Provisional Application Ser. No. 60/780,963 filed Mar. 10, 2006, the contents of which are hereby incorporated by reference.

BACKGROUND OF THE INVENTION

This invention relates to the preparation and use of mixed matrix membranes containing molecular sieve nanoparticles. These mixed matrix membranes are useful for the separation of fluids and gases, including the separation of carbon dioxide from natural gas.

The use of membranes for separation of both gases and liquids is a growing technological area with potentially high economic reward due to the low energy requirements and the potential for scaling up of modular membrane designs. Advances in membrane technology, with the continuing development of new membrane materials will make this technology even more competitive with traditional, high-energy intensive and costly processes such as distillation. Among the applications for large scale gas separation membrane systems are nitrogen enrichment, oxygen enrichment, hydrogen recovery, removal of hydrogen sulfide and carbon dioxide from natural gas and dehydration of air and natural gas. Also, various hydrocarbon separations are potential applications for the appropriate membrane system. The materials that are used in these applications must have durability, productivity in processing large volumes of gas or liquid and high separation performance in order to be economically successful. Membrane gas separation has evolved rapidly in the past 25 years due to its easy processability for scale-up and low energy requirements. More than 90% of the membrane gas separation applications involve the separation of noncondensable gases: such as carbon dioxide from methane, nitrogen from air, and hydrogen from nitrogen, argon or methane. Membrane gas separation is of special interest to petroleum producers and refiners, chemical companies, and industrial gas suppliers. Several applications of membrane gas separation have achieved commercial success, including carbon dioxide removal from natural gas and biogas and in enhanced oil recovery.

The membranes most commonly used in commercial gas separation applications are polymeric and nonporous. Gas separation by these membranes is based on a solution-diffusion mechanism. This mechanism involves molecular-scale interactions of the permeating gas with the membrane polymer. This mechanism assumes that each component is sorbed by the membrane at one interface, transported by diffusion across the membrane through the voids between the polymeric chains (or called free volume), and desorbed at the other interface. According to the solution-diffusion model, the membrane performance for a given pair of gases (e.g., $CO_2/CH_4$, $O_2/N_2$, $H_2/CH_4$) is determined by two parameters: permeability coefficient ($P_A$) and the selectivity ($\alpha_{A/B}$). The $P_A$ is the product of the gas flux and the membrane thickness, divided by the pressure difference across the membrane. The $\alpha_{A/B}$ is the ratio of the permeability coefficients of the two gases $\alpha_{A/B}=P_A/P_B$) where $P_A$ is the permeability of the more permeable gas and $P_B$ is the permeability of the less permeable gas. Gases can have high permeability coefficient because of a high solubility coefficient, a high diffusion coefficient, or both. The diffusion coefficient decreases and the solubility coefficient increases with the increase in the molecular size of the gas. For high-performance polymer membranes, both high permeability and selectivity are desirable because higher permeability decreases the size of the membrane area required to treat a given amount of gas, thereby decreasing the capital cost of membrane units, and because higher selectivity results in a higher purity product gas with increased efficiency.

The polymers used in membranes provide a range of properties such as low cost, high permeability, good mechanical stability, and ease of processability that are important for gas separation. Polymer modification can improve membrane selectivity. A polymer material with a high glass-transition temperature ($T_g$), high melting point, and high crystallinity is preferred. Glassy polymers (i.e., polymers below their $T_g$) have stiffer polymer backbones and therefore let the smaller molecules of gases such as hydrogen and helium pass more quickly, while larger molecules such as hydrocarbon gases permeate the membrane more slowly. However, it is well known that polymers which are more permeable are generally less selective and vice versa. A rather general trade-off has always existed between permeability and selectivity (the so-called polymer upper bound limit). Over the past 30 years, a substantial research effort has been directed to overcoming the limit imposed by the upper bound. Various polymers and techniques have been used, but without much success. For example, many polyimide and polyetherimide glass polymers have much higher intrinsic $CO_2/CH_4$ selectivities than that of cellulose acetate. However, these polymers do not have outstanding permeabilities compared to cellulose acetates.

Cellulose acetate (CA) glassy polymer membranes are used extensively in gas separation. Although CA membranes have many advantages, they are limited in terms of selectivity, chemical, thermal, and mechanical stability. One of the immediate challenges facing CA polymer membranes is achieving higher selectivity with equal or greater permeability or to develop other polymer membranes that have the desired combination of properties.

Inorganic membranes, such as purely molecular sieve zeolite membranes, are capable of overcoming the challenges facing polymer membranes. For example, molecular sieve DDR type zeolite membranes have shown much higher $CO_2$ permeability and selectivity for $CO_2$ over $CH_4$ compared to CA polymer membranes. However, these zeolite membranes have poor processability and cannot be fabricated in an economically feasible way with current manufacturing techniques for large-scale applications.

Mixed matrix membranes have been developed that include hybrid blend membranes comprising particles such as molecular sieve particles embedded in a polymer matrix. They combine the low cost and easy processability of the polymer phase with the superior gas separation properties of the molecular sieve phase. These membranes have the potential to achieve higher selectivity with equal or greater permeability compared to existing polymer membranes, while maintaining their advantages. There are many types of mixed matrix membranes reported in the literature such as dispersed solid-polymer mixed matrix membranes which have dispersed solids in polymer phase such as zeolite-polyimide mixed matrix membranes. In contrast to the reports of conventional polymers for membranes in the past 25 years, only a few attempts to increase gas separation membrane performance with mixed matrix membranes of zeolite and rubbery or glassy polymers have been reported.

To date, studies on mixed matrix membranes have used commercially available zeolite particles with relatively large particle sizes in the micron range. See Yong et al., J. MEMBR. SCI., 188:151 (2001); U.S. Pat. No. 5,127,925; U.S. Pat. No. 4,925,562; U.S. Pat. No. 4,925,459; and US 2005/0043167 A1. Commercially available polymer membranes, such as CA and polysulfone membranes, have an asymmetric structure with a thin selective layer. As a consequence, the minimal selective layer thickness of the mixed matrix membranes should be inherently higher than that of most unfilled membranes and the absolute fluxes would be low. Therefore, large zeolite particles having diameters in the micron range are unattractive for mixed matrix membranes. It is highly desirable therefore to use much smaller particles in mixed matrix membranes. One such type of small particles that has been recently developed is the molecular sieve nanoparticles (or so-called nano-molecular sieve particles, e.g. zeolite nanoparticles) which would make it possible to prepare thin, defect-free, nanoparticle filled polymer layers. However, molecular sieve nanoparticles synthesized in the form of a stable colloidal suspension usually contain an organic structure directing agent (SDA) (or so-called template) in the intracrystalline voids. This template has to be removed to form template-free molecular sieve nanoparticles for mixed matrix membrane applications to take advantage of the microporosity of the molecular sieves. The normal direct high temperature calcination that is used to remove the template from such molecular sieves for other uses, such as catalysts, has been found to be unsuitable for colloidal nanocrystals because it leads to significant irreversible aggregation, and non-homogeneous dispersion of the molecular sieves in the polymer. In one commercial example of nanozeolites, the template-free particles are two to three times the diameter of the particles prior to removal of the template. There have been several reports of methods to disperse such nanozeolites in polymers. Most recently, Yan et al. reported a novel technique for the preparation of dispersible template-removed zeolite nanocrystals in various solvents by using an organic polymer network as a temporary barrier during calcinations to prevent zeolite nanocrystal aggregation. See Wang et al., CHEM. COMMUN., 2333 (2000). Smaihi et al. reported the successful preparation of colloidal calcined zeolite nanocrystals by either a grafting-calcination method or a grafting-solvent extraction method. See J. MATER. CHEM., 14:1347 (2004); Gautier et al., NEW J. CHEM., 28:457 (2004). Vankelecom et al. reported the first incorporation of nano-sized zeolites in membranes by dispersing colloidal silicalite-1 in polydimethylsiloxane polymer membrane. See Moermans et al., CHEM. COMMUN., 2467 (2000). Homogeneous polymer-zeolite mixed matrix membranes were also fabricated by the incorporation of dispersible template-removed zeolite A nanocrystals into polysulfone matrix. See Yan et al., J. MATER. CHEM., 12:3640 (2002).

However, it is still desired to develop a process to treat molecular sieve nanoparticles to uniformly disperse them within a polymer matrix. We have now found that surface-functionalized template-free molecular sieve nanoparticles have enhanced dispersity in polar organic solvents as well as an improved ability to adhere to an organic polymer matrix to form a mixed matrix membrane in a void-free fashion and provide for mixed matrix membrane that has an optimized combination of higher permeability and selectivity for gas separation applications.

SUMMARY OF THE INVENTION

One aspect of the present invention provides a substantially void free, nano-molecular sieve/polymer mixed matrix membrane (or mixed matrix dense film) that includes a continuous polymer matrix and nano-molecular sieves uniformly distributed throughout the continuous polymer matrix phase. The mixed matrix membrane may be in the form of a dense film. The mixed matrix dense film may have a symmetric structure with discrete molecular sieve nanoparticles uniformly distributed throughout the polymer matrix. The mixed matrix membrane may also be in the form of an asymmetric flat sheet. This mixed matrix membrane has an asymmetric structure consisting of a highly porous substrate layer coated with a thin selective separation layer. The porous substrate layer and the selective separation layer can be made from the same polymer or two different polymers. The molecular sieve nanoparticles are incorporated into the thin selective separation layer or into both the thin selective separation layer and the porous substrate layer. The resulting mixed matrix membrane thus has a tightly packed layer with nano-molecular-sieving media supported within a polymer matrix.

In another aspect, the present invention provides a method for preparing the substantially void free mixed matrix membranes that includes dispersing molecular sieve nanoparticles or surface-functionalized molecular sieve nanoparticles in a polymer solution; casting the solution on glass plate; and evaporating the solvent to form a mixed matrix membrane having a proportion of about 5 to 70 weight parts molecular sieve nanoparticles per 100 weight parts polymer. The mixed matrix membranes include a continuous polymer phase formed from polymers such as cellulose acetate, cellulose triacetate, polysulfone, polyethersulfone, polyimide, polyetherimide, polyamide, cellulose nitrate, polyurethane, polycarbonate, polystyrene, etc. More specifically, the mixed matrix membranes of the present invention exhibit high permeability and selectivity for gas separation such as carbon dioxide removal from natural gas.

In yet another aspect of the present invention there is provided an organic ligand-grafting-calcination method of preparing molecular sieve nanoparticles that includes grafting organic functional ligands on the surface of as-synthesized template-containing colloidal molecular sieve nanoparticles and removing the structure-directing template by calcination. The organic functional ligand may be an organosilane such as a compound having the formula $R(CH_2)_nSi(OR_1)_3$ in which R is a functional group, n is an integer from 1 to 20, and $R_1$ is a $C_1$-$C_8$ hydrocarbon group. The functional organosilane ligands can reduce or even prevent agglomeration of the molecular sieve nanoparticles during calcinations which may be irreversible. The as-synthesized template-containing colloidal molecular sieve nanoparticles are inorganic crystalline structures with micropores filled by a structure directing agent (SDA) or template. These as-synthesized template-containing nano-molecular sieves, which could be synthesized using well known colloidal molecular sieve synthesis techniques, may include Si-MFI (or silicalite-1), SAPO-34, Si-MTW, Si-BEA, Si-MEL, LTA, FAU, Si-DDR, AlPO-14, AlPO-34, AlPO-18, AlPO-25, AlPO-5, SSZ-62, UZM-9, UZM-25, CDS-1, MCM-65, Nu-6(2), as well as others known to those skilled in the art. After calcinations, the nano-molecular sieves have micropores which can separate molecules from a mixture with high selectivity due to the combination of molecular sieving and selective sorption.

In another aspect of the present invention, there is provide an organic ligand-grafting-calcination-organic ligand-grafting method of preparing surface-functionalized nano-molecular sieves that includes grafting functional organosilane ligands (or linkages) (e.g. a compound having the formula $R(CH_2)_nSi(OR_1)_3$ in which R is a functional group, n is an integer from 1 to 20, and $R_1$ is a $C_1$-$C_8$ hydrocarbon group) on the surface of as-synthesized template-containing colloidal molecular sieve nanoparticles, removing the structure-directing template by high temperature calcination, and then further functionalizing the calcined nano-molecular sieves by a second grafting step using functional organosilane linkages (e.g. a compound having the formula $R_2(CH_2)_m SiR'(R'')(OR_3)$ in which $R_2$ is a functional group, m is an integer from 1 to 20, and R', R'', $R_2$, and $R_3$ are $C_1$-$C_8$ hydrocarbon groups, and R, R', R'', $R_1$, $R_2$, $R_3$, m, n are each independently) to yield surface-functionalized template-free molecular sieve nanoparticles. The functionalized surface should enhance the dispersity of molecular sieve nanoparticles in organic solvents, and also should improve adhesion and interaction between the polymer matrix and the external surface of the molecular sieve nanoparticles. The functionalized template-free nano-molecular sieves may include Si-MFI (or silicalite-1), SAPO-34, Si-MTW, Si-BEA, Si-MEL, LTA, FAU, Si-DDR, AlPO-14, AlPO-34, AlPO-18, AlPO-25, AlPO-5, SSZ-62, UZM-9, UZM-25, CDS-1, MCM-65, Nu-6(2), as well as others known to those skilled in the art.

In yet another aspect, the present invention provides a process for separating a permeable component gas from a gas mixture comprising the permeable component and natural gas or other nonpermeable or low permeable component using the mixed matrix membrane described herein. The process comprises contacting the gas mixture on one side of the membrane to cause the component gases to selectively permeate the membrane, and removing from the opposite side of the membrane a permeate gas composition enriched in concentration of the at least one component gas.

A mixed matrix membrane is made which combines the superior gas separation properties of the nano-molecular sieve phase with the low cost and easy processability of the polymer phase. A mixed matrix membrane is prepared that has high permeability and selectivity with a given loading of nano-molecular sieves or surface-functionalized nano-molecular sieves for gas separation such as $CO_2$ removal from natural gas.

DETAILED DESCRIPTION OF THE INVENTION

The present invention pertains to mixed matrix membranes (or mixed matrix films). The term "mixed matrix" means that the membrane has a selective gas permeable layer which comprises a continuous phase of a polymeric material and discrete molecular sieve nanoparticles uniformly dispersed throughout the continuous polymer phase. One of the main uses of these mixed matrix membranes is for the separation of two or more gases or for purification of gas mixtures. One such separation is carbon dioxide removal from natural gas. A mixed matrix membrane that is used to purify natural gas permits carbon dioxide to diffuse through it at a faster rate than does the product methane. Carbon dioxide has a higher permeation rate than methane because of higher solubility, higher diffusivity, or both. Thus, carbon dioxide enriches on the permeate side of the membrane, and methane enriches on the feed (or reject) side of the membrane.

Any given pair of gases that differ in molecular size can be separated, including for example, nitrogen and oxygen, carbon dioxide and methane, hydrogen and methane or carbon monoxide, and helium and methane, using the mixed matrix membranes prepared in accordance with the present invention. For example, the components which can be selectively removed from a raw natural gas using the membranes described herein include carbon dioxide, oxygen, nitrogen, water vapor, hydrogen sulfide, helium, and other trace gases. The components that can be selectively retained include hydrocarbon gases.

The mixed matrix membranes developed in this invention are organic-inorganic hybrid membranes comprising discrete molecular sieve nanoparticles uniformly dispersed throughout the continuous polymer phase. Preferably, the molecular sieve nanoparticles incorporated into the polymer matrix are grafted by organic ligands to significantly reduce irreversible agglomeration during calcination. In another embodiment of the present invention, the molecular sieve nanoparticles incorporated into the polymer matrix are surface-functionalized by a second organic ligand grafting step after initial organic ligand grafting and calcination to improve the dispersity of the molecular sieve nanoparticles in organic solvents and to enhance adhesion between the polymer phase and the external surface of the molecular sieve nanoparticles. The resulting mixed matrix membrane has steady state permeability different from that of the pure polymer due to the combination of the solution-diffusion gas separation mechanism of the polymer phase with the molecular sieving gas separation mechanism of the nano-molecular sieve phase.

Design of mixed matrix membranes with superior gas separation properties is based on the proper selection of nano-molecular sieve and polymer, and is measured by the permeability and selectivity of the membrane, as well as the mechanical properties of the membrane. Material selection for both polymer phase and nano-molecular sieve phase is a key aspect for the preparation of mixed matrix membranes that have the desired properties.

Polymers provide a wide range of properties important for separations, and modifying the polymer can improve membrane selectivity. A material with a high glass transition temperature ($T_g$), high melting point, and a high degree of crystallinity is preferred for most gas separations. Glassy polymers (i.e., polymers below their $T_g$) have stiffer polymer backbones and provide a selective environment for gas diffusion which allows smaller molecules such as hydrogen and helium to permeate the membrane more quickly and larger molecules such as hydrocarbons to permeate the membrane more slowly. Suitable polymers include polyimides, polysulfones and cellulosic polymers.

For mixed matrix membrane applications included in the current invention, it is preferred that the membrane is fabricated from a pure polymer, which can be used as the continuous polymer phase in the mixed matrix membranes, exhibiting a carbon dioxide or hydrogen over methane selectivity of at least about 10, and more preferably at least about 20. Preferably, the polymer used as the continuous polymer phase in the mixed matrix membrane is a rigid, glassy polymer.

Among the polymers that are suitable for mixed matrix membrane preparation are polysiloxanes, polycarbonates, silicone-containing polycarbonates, brominated polycarbonates polysulfones; poly(styrenes), including styrene-containing copolymers such as acrylonitrilestyrene copolymers, styrene-butadiene copolymers and styrene-vinylbenzylhalide copolymers; polycarbonates; cellulosic polymers, such as cellulose acetate-butyrate, cellulose propionate, ethyl cellulose, methyl cellulose, nitrocellulose, etc.; polyamides and polyimides, including aryl polyamides and aryl polyimides; polyethers; poly(arylene oxides) such as poly(phenylene oxide) and poly(xylene oxide); poly(esteramide-diisocyanate); polyurethanes; polyesters (including polyarylates), such as poly(ethylene terephthalate), poly(alkyl methacrylates), poly(acrylates), poly(phenylene terephthalate), etc.; polysulfides; polymers from monomers having alpha-olefinic unsaturation other than mentioned above such as poly (ethylene), poly(propylene), poly(butene-1), poly(4-methyl pentene-1), polyvinyls, e.g., poly(vinyl chloride), poly(vinyl fluoride), poly(vinylidene chloride), poly(vinylidene fluoride), poly (vinyl alcohol), poly(vinyl esters) such as poly(vinyl acetate) and poly(vinyl propionate), poly(vinyl pyridines), poly(vinyl pyrrolidones), poly(vinyl ethers), poly(vinyl ketones), poly (vinyl aldehydes) such as poly(vinyl formal) and poly(vinyl butyral), poly(vinyl amides), poly(vinyl amines), poly(vinyl urethanes), poly(vinyl ureas), poly(vinyl phosphates), and poly(vinyl sulfates); polyallyls; poly(benzobenzimidazole); polyhydrazides; polyoxadiazoles; polytriazoles; poly(benzimidazole); polycarbodiimides; polyphosphazines; etc., and interpolymers, including block interpolymers containing repeating units from the above such as terpolymers of acrylonitrile-vinyl bromide-sodium salt of para-sulfophenylmethallyl ethers; and grafts and blends containing any of the foregoing. Typical substituents providing substituted polymers include halogens such as fluorine, chlorine and bromine; hydroxyl groups; lower alkyl groups; lower alkoxy groups; monocyclic aryl; and lower acyl groups.

Preferred polymers are selected from the group consisting of polysiloxane, polycarbonates, silicone-containing polycarbonates, brominated polycarbonates, polysulfones, polyether sulfones, sulfonated polysulfones, sulfonated polyether sulfones, polyimides, polyether imides, polyketones, polyether ketones, polyamides, polyamide/imides, polyolefins such as poly-4-methyl pentene, polyacetylenes such as polytrimethysilylpropyne, and fluoropolymers including fluorinated polymers and copolymers of fluorinated monomers such as fluorinated olefins and fluorodioxoles, and cellulosic polymers, such as cellulose diacetate and cellulose triacetate. Cellulose acetate polymers are frequently used, but have lower selectivity between gases than polyimide polymers. However, polyimide polymers have lower permeability than desired.

Molecular sieves are believed to improve the performance of the mixed matrix membrane by including selective holes/pores with a size that permits a gas such as carbon dioxide to pass through, but either not permitting another gas such as methane to pass through, or permitting it to pass through at a significantly slower rate. The molecular sieves should have higher selectivity for the desired gas separation than the original polymer to enhance the performance of the mixed matrix membrane. For the desired gas separation in the mixed matrix membrane, it is preferred that the steady-state permeability of the faster permeating gas component in the molecular sieves be at least equal to that of the faster permeating gas in the original polymer matrix phase. Molecular sieves have framework structures which may be characterized by distinctive wide-angle X-ray diffraction patterns. Zeolites are a subclass of molecular sieves based on an aluminosilicate composition. Non-zeolitic molecular sieves are based on other compositions such as aluminophosphates, silico-aluminophosphates, and silica. Molecular sieves of different chemical compositions can have the same framework structure.

Zeolites can be further broadly described as molecular sieves in which complex aluminosilicate molecules assemble to define a three-dimensional framework structure enclosing cavities occupied by ions and water molecules which can move with significant freedom within the zeolite matrix. In commercially useful zeolites, the water molecules can be removed from or replaced without destroying the framework structure. Zeolite composition can be represented by the following formula: $M_{2/n}O:Al_2O_3:xSiO_2:yH_2O$, wherein M is a cation of valence n, x is greater than or equal to 2, and y is a number determined by the porosity and the hydration state of the zeolites, generally from 0 to 8. In naturally occurring zeolites, M is principally represented by Na, Ca, K, Mg and Ba in proportions usually reflecting their approximate geochemical abundance. The cations M are loosely bound to the structure and can frequently be completely or partially replaced with other cations or hydrogen by conventional ion exchange. Acid forms of molecular sieve sorbents can be prepared by a variety of techniques including ammonium exchange followed by calcination or by direct exchange of alkali ions for protons using mineral acids or ion exchangers. Molecular sieve materials are microporous crystals with pores of a well-defined size ranging from 0.2 to 2 nm. This discrete porosity provides molecular sieving properties to these materials which have found wide applications as catalysts and sorption media. Molecular sieve structure types can be identified by their structure type code as assigned by the IZA Structure Commission following the rules set up by the IUPAC Commission on Zeolite Nomenclature. Each unique framework topology is designated by a structure type code consisting of three capital letters. Preferred low silica-to-alumina molar ratio molecular sieves used in the present invention include molecular sieves having IZA structural designations of AEI, CHA, ERI, LEV, AFX, AFT and GIS. Exemplary compositions of such small pore alumina containing molecular sieves include non-zeolitic molecular sieves (NZMS) comprising certain aluminophosphates (AlPO's), silicoaluminophosphates (SAPO's), metallo-aluminophosphates (MeAPO's), elemental aluminophosphates (ElAPO's), metallo-silicoaluminophosphates (MeAPSO's) and elemental silicoaluminophosphates (ElAPSO's). Representative examples of molecular sieves are small pore molecular sieves such as SAPO-34, Si-DDR, AlPO-14, AlPO-34, AlPO-18, LTA, UZM-25, CDS-1, MCM-65, MCM-47, SAPO-18, AlPO-17, AlPO-25, AlPO-EN3, SAPO-44, SAPO-47, SAPO-17, CVX-7, SAPO-35, SAPO-56, AlPO-52, SAPO-43, SSZ-62, SSZ-13, UZM-5, MAPO-34, Nu-6(2), medium pore molecular sieves such as Si-MFI, Si-BEA, Si-MEL, and large pore molecular sieves such as FAU, OFF, zeolite L, NaX, NaY, and CaY.

Nano-molecular sieves (or "molecular sieve nanoparticles") described herein are sub-micron size molecular sieves with particle sizes in the range of 5 to 1000 nm. Nano-molecular sieve selection for the preparation of mixed matrix membranes includes screening the dispersity of the nano-molecular sieves in organic solvent, the porosity, particle size, and surface functionality of the nano-molecular sieves, the adhesion or wetting property of the nano-molecular sieves with the polymer matrix. Nano-molecular sieves for the preparation of mixed matrix membranes should have suitable pore size to allow selective permeation of a smaller sized gas, and also should have appropriate particle size in the nanometer range to prevent defects in the membranes. The surface functionality of the nano-molecular sieves also should be tailored to improve the compatibility between the polymer and the inorganic nano-molecular sieves. The nano-molecular sieves should be easily dispersed without agglomerating in the polymer matrix to maximize the transport property.

The nano-molecular sieves described herein are synthesized from initially clear solutions. Representative examples of nano-molecular sieves suitable to be incorporated into the mixed matrix membranes described herein include Si-MFI (or silicalite-1), SAPO-34, Si-MTW, Si-BEA, Si-MEL, LTA, FAU, Si-DDR, AlPO-14, AlPO-34, AlPO-18, SSZ-62, UZM-9, AlPO-25, AlPO-5, SSZ-62, SSZ-13, UZM-25, CDS-1, Nu-6(2), and MCM-65. Molecular sieve nanoparticles synthesized in the form of a stable colloidal suspension usually contain an organic structure directing agent (SDA) (or so-called template) in the intracrystalline voids. This SDA has to be removed for mixed matrix membrane applications to take advantage of the large external surface and the favorable molecular sieving and selective sorption of the internal micropores of the nano-molecular sieves. Direct high temperature calcination has been found to be unsuitable for colloidal nanocrystals because it leads to significant irreversible aggregation and non-homogeneous dispersion in polymer.

The nano-molecular sieves described herein in several embodiments of the invention include both dispersible template-removed molecular sieve nanoparticles and surface-functionalized dispersible template-removed molecular sieve nanoparticles.

Among the preferred nano-molecular sieves to be used are nano-AlPO-18, nano-AlPO-14, nano-AlPO-25, nano-SSZ-62, nano-SSZ-13, nano-UZM-25, nano-CDS-1, nano-MCM-65, nano-Nu-6(2), nano-Si-MFI, and nano-SAPO-34 molecular sieve.

The synthesis of colloidal template-containing Si-MFI nanoparticles is well established in the literature. See Navrotsky, et al., CHEM. MATER., 16:210 (2004) and references thereof. The preparation procedure used in this invention is similar to that used in the literature (Navrotsky, et al., CHEM. MATER., 16:210 (2004)). A precursor solution with composition of 9:25:480:100 TPAOH:TEOS:$H_2O$:$C_2H_5OH$ was prepared using tetrapropylammonium hydroxide solution (TPAOH: Alfa, 40%), tetraethyl orthosilicate (TEOS: Alfa, 99.9%), and deionized (DI) water. After stirring and digesting at elevated temperature, a sol of 90 nm, crystalline, Si-MFI nanoparticles were obtained. The sol had a pH in the range of 12.5 to 13.5. In order to remove anionic species from the "raw" silicalite sols, they were contacted with an anion exchange resin in the basic (OH) form. The removal of cationic species from the silicalite sols was also desired, and this was accomplished by contact of the anion-exchanged sols with cation exchange resin in the acid (H) form. The as-synthesized template-containing nano-Si-MFI slurry in $H_2O$ (~5.5 wt-% solid, pH=10, 90 nm particle size) was then diluted with water in order to adjust the concentration to 4 wt-%. The outside surface of the template-containing Si-MFI nanoparticles was functionalized by reaction with an ethanol solution of aminopropyltriethoxysilane (APTS, $H_2N(CH_2)_3Si(OC_2H_5)_3$) in a 4-fold excess relative to the amount of APTS needed for full surface coverage on the particles. The APTS organic reagent:Si-MFI particle ratio was fixed at 1 mmol/g. After the reaction, the excess of APTS reagent was eliminated by repeated centrifugation (10000 rpm) and re-dispersion in ethanol and then water by ultrasonication. The recovered template-containing solid was dried at 80° to 90° C. overnight and calcinated at 550° C. for 6 hours under air (heating rate 2° C./min) to form template-free nano-Si-MFI.

Template-free SAPO-34 nanoparticles were prepared from as-synthesized template-containing SAPO-34 nanoparticles according to a similar method used for template-free Si-MFI nanoparticles. For the synthesis of as-synthesized template-containing SAPO-34 nanoparticles, a precursor solution with a composition of 0.3$SiO_2$:$Al_2O_3$:$H_3PO_4$:TEAOH:40$H_2O$ was prepared using tetraethylammonium hydroxide solution (TEAOH), Ludox® AS40 colloidal silica (W R Grace, Baltimore, Md.), Versal® alumina (UOP LLC, Des Plaines, Ill.), and deionized water. The precursor solution was then stirred at room temperature and then at elevated temperature. After stirring and digesting at elevated temperature, a sol of crystalline, SAPO-34 nanoparticles was obtained. The solid nanoparticles were then collected by centrifugation and washed with water.

Template-free AlPO-18 nanoparticles were prepared from as-synthesized template-containing AlPO-18 nanoparticles according to a similar method used for template-free Si-MFI nanoparticles.

The template-free Si-MFI, AlPO-18, and SAPO-34 nanoparticles synthesized by the organic ligand-grafting-calcination method are redispersible in organic solvents. In contrast, the template-free Si-MFI, AlPO-18, and SAPO-34 solids prepared without organic ligand grafting form stable aggregations and cannot redisperse in any solvent.

The template-free nano-Si-MFI, nano-AlPO-18, and nano-SAPO-34 were characterized by a series of techniques including elemental analysis, dynamic light scattering (DLS), X-ray diffraction (XRD), transmission electronic microscopy (TEM), and solid-state $^{29}$Si NMR.

Tables 1-3 summarize the dynamic light scattering (DLS) results for template-containing and template-free nano-Si-MFI, nano-AlPO-18, and nano-SAPO-34, respectively. DLS results provide particle size and degree of dispersion in a liquid for the nano-molecular sieves. The DLS results for nano-Si-MFI (Table 1) indicate that the 3-aminopropyltriethoxysilane (APTS)-grafted template-containing nano-Si-MFI (template-containing APTS-nano-Si-MFI), which was synthesized from as-synthesized template-containing nano-Si-MFI with an average particle size of ~90 nm, can be well dispersed in methanol and the particle size is about 110 nm. After calcination of APTS-nano-Si-MFI to remove the template, the nano-Si-MFI still can be re-dispersed in ethanol with an average particle size of ~123 nm. This demonstrates that grafted organic ligands prevent irreversible aggregation between nanocrystals during the calcination process.

TABLE 1

DLS results for nano-Si-MFI

| Sample | Solvent | Z-Average (nm) | PDI | Cumulants fit error | Data Quality |
|---|---|---|---|---|---|
| Template-containing nano-Si-MFI [a)] | $H_2O$ | 90.6 | 0.032 | 0.0002825 | good |
| Template-containing APTS-nano-Si-MFI | MeOH | 110.4 | 0.099 | 0.0007568 | good |
| Template-free nano-Si-MFI | EtOH | 122.9 | 0.200 | 0.0006404 | good |
| Template-free nano-Si-MFI | 1,4-dioxane | ~900-1100 | — | — | bad |
| Template-free PEG-nano-Si-MFI | 1,4-dioxane | 125.5 | 0.177 | 0.00281 | good |
| Template-free IDZ-nano-Si-MFI | 1,4-dioxane | ~2000-3700 | — | — | bad |

TABLE 2

DLS results for nano-SAPO-34

| Sample | Solvent | Z-Average (nm) | PDI | Cumulants fit error | Data Quality |
|---|---|---|---|---|---|
| Template-containing nano-SAPO-34 [b)] | $H_2O$ | 355.9 | 0.107 | 0.0003931 | good |
| Template-containing APTS-nano-SAPO-34 | $H_2O$ | ~3000-4000 | — | — | bad |
| Template-free nano-SAPO-34 | EtOH | ~620-660 | 0.185 | 0.0010190 | Relatively good |
| Template-free nano-SAPO-34 | 1,4-dioxane | ~2000-3500 | — | — | bad |
| Template-free PEG-nano-SAPO-34 | 1,4-dioxane | ~3500-4500 | — | — | bad |
| Template-free IDZ-nano-SAPO-34 | 1,4-dioxane | — | — | — | bad |

TABLE 3

DLS results for nano-AlPO-18

| Sample | Solvent | Z-Average (nm) | PDI | Cumulants fit error |
|---|---|---|---|---|
| Template-containing APTS-nano-AlPO-18 | $H_2O$ | 246.1 | 0.167 | 0.000744 |

The DLS results for nano-SAPO-34 (Table 2) suggest that the as-synthesized template-containing nano-SAPO-34 has an average particle size of about 356 nm. After APTS grafting, the APTS-nano-SAPO-34 aggregated easily with particle size on the order of 3-4 microns. After further calcination, relatively dispersible template-free nano-SAPO-34 could be produced with an average particle size of about 620-660 nm in ethanol.

The DLS results for nano-AlPO-18 (Table 3) suggest that the as-synthesized template-containing APTS grafted APTS-nano-AlPO-18 has an average particle size of about 250 nm.

TEM images of APTS-nano-Si-MFI showed that dispersion of this grafted nano-Si-MFI on the TEM grid was unusually good. TEM images indicated that the average particle size was around 60 nm, which is relatively smaller than that obtained from DLS analysis (around 110 nm). This difference is because TEM image gives the particle size of dry particles while DLS measurement provides wet particle size. The wet nanoparticles shrink after drying.

In order to confirm the successful grafting of APTS on Si-MFI nanoparticles, $^{29}$Si cross-polarization magic angle spinning (CP-MAS) NMR was performed for the APTS-nano-Si-MFI sample to characterize the surface bonding. Resonance around −112 ppm is assigned to $Si(OSi)_4$ species with minor resolution of crystallographic sites. The signal at −102 ppm is assigned to $Si(OSi)_3OH$ species. An additional small signal around −67 ppm (corresponding to (—$Si(OSi)_3$ species of about 3.8%) indicated that the aminosilane (APTS) group was covalently linked to the framework silicon atom, suggesting the successful grafting.

TEM images of template-free nano-Si-MFI prepared by APTS grafting method. The TEM sample for template-free nano-Si-MFI suspension in 1,4-dioxane. The crystallites were similar to those of APTS-nano-Si-MFI in size and shape. The distribution of this sample is more heterogeneous and agglomerated than that of APTS-nano-Si-MFI sample, which is in good agreement with the DLS results.

TEM images of as-synthesized template-containing nano-SAPO-34 were made of a sample that had typical SAPO-34 appearance with particle size of about 100-150 nm, which is smaller than the particle size measured using DLS method. The TEM images of the template-free nano-SAPO-34 sample prepared by APTS grafting method were very similar to those of the as-synthesized SAPO-34, both in terms of the particle size (30-150 nm) and in terms of having some extraneous debris.

Powder X-ray diffraction (XRD) analyses were performed on the calcinated nano-Si-MFI and nano-SAPO-34 prepared by organic ligand grafting method or without using organic ligand grafting method. According to the XRD analysis, the organic grafting pre-treatment of the as-synthesized nano-zeolites did not alter the crystallinity of the zeolites.

Table 4 summarizes the chemical composition and nitrogen adsorption measurements of the nano-Si-MFI and nano-SAPO-34. CHN elemental analysis data confirmed the successful removal of templates during calcination. In order to follow the influence of the surface treatment by organic ligand (APTS) grafting on the porous characteristics of the samples, nitrogen gas sorption measurements were performed on the as-synthesized nano-zeolites, calcinated template-free nano-zeolites prepared without APTS grafting and with APTS grafting. APTS grafting of the nano-zeolites before calcinations does not modify drastically the adsorption capacity of the template-free materials. Calcinated template-free nano-Si-MFI and nano-SAPO-34 show BET surface area of 428 and 470 $m^2/g$, and show micropore volumes of 0.19 and 0.22 $cm^3/g$, respectively.

TABLE 4

Chemical composition and $N_2$ adsorption measurements of nano-Si-MFI and nano-SAPO-34

| Sample | Elemental analysis | | | | | | LOI | Si/Al | Porosity | |
|---|---|---|---|---|---|---|---|---|---|---|
| | %C | %H | %N | %Si | %Al | %P | | | BET area ($m^2g^{-1}$) | Micropore vol. ($cm^3g^{-1}$) |
| Template-containing nano-Si-MFI | 10.5 | 2.4 | 1.2 | 47.2 | — | — | 16.8 | — | — | — |
| Template-containing APTS-nano-Si-MFI | 10.3 | 2.4 | 1.5 | 46.9 | — | — | 16.4 | — | 58 | 0.003 |
| Template-free nano-Si-MFI without APTS grafting | — | — | — | — | — | — | — | — | 430 | 0.20 |
| Template-free nano-Si-MFI after APTS grafting | <0.1 | 0.2 | 0.2 | 46.2 | — | — | 1.66 | — | 428 | 0.19 |
| Template-containing nano-SAPO-34 | 10.2 | 2.6 | 1.7 | 4.04 | 22.5 | 20.9 | 15.3 | 0.1725 | 91 | 0.002 |

TABLE 4-continued

Chemical composition and $N_2$ adsorption measurements of nano-Si-MFI and nano-SAPO-34

| Sample | %C | %H | %N | %Si | %Al | %P | LOI | Si/Al | BET area ($m^2g^{-1}$) | Micropore vol. ($cm^3g^{-1}$) |
|---|---|---|---|---|---|---|---|---|---|---|
| Template-containing APTS-nano-SAPO-34 | 11.0 | 3.0 | 3.3 | 8.05 | 20.7 | 19.0 | 19.9 | 0.3735 | 58 | 0 |
| Template-free nano-SAPO-34 without APTS grafting | — | — | — | — | — | — | — | — | 538 | 0.23 |
| Template-free nano-SAPO-34 after APTS grafting | <0.1 | 0.6 | 0.2 | 6.52 | 21.4 | 19.7 | 4.77 | 0.2926 | 470 | 0.22 |

Template-free nano-Si-MFI, nano-AlPO-18, and nano-SAPO-34 prepared using organic ligand grafting method were further functionalized by poly(ethylene glycol) (PEG) or an imidazole (IDZ) organic ligand. The objective was to improve the dispersity of the nano-molecular sieves in polar organic solvents and to improve their adhesion or wetting between the polymer phase and the external surface of the solid particles to reduce voids and defects in the mixed matrix dense films. The organic ligands were grafted at silicon (or aluminum) surface molecular sieve atoms through —Si—O—Si— or —Al—O—Si— covalent bonds. The surface-functionalized nano-molecular sieves were named as template-free PEG-nano-Si-MFI, PEG-nano-AlPO-18, IDZ-nano-AlPO-18, IDZ-nano-Si-MFI, PEG-nano-SAPO-34, and IDZ-nano-SAPO-34.

The chemical composition, morphology, porosity, and particle size of these materials have been characterized by elemental analysis, DLS, $^{29}$Si CP-MAS NMR, nitrogen gas sorption, and TEM. The DLS study showed that the template-free PEG-nano-Si-MFI has good dispersity in 1,4-dioxane with an average particle size of about 125 nm (Table 5). The template-free nano-Si-MFI without post-functionalization cannot disperse very well in 1,4-dioxane. These results demonstrated that grafted PEG organic ligands increased the dispersity of the template-free nano-Si-MFI in 1,4-dioxane and significantly reduced the aggregation between nanoparticles.

TABLE 5

Chemical composition and $N_2$ adsorption measurements of organic ligand-grafted template-free nano-Si-MFI and nano-SAPO-34

| Sample | %C | %H | %N | %Si | %Al | %P | LOI | Si/Al | BET area ($m^2g^{-1}$) | Micropore volume ($cm^3g^{-1}$) |
|---|---|---|---|---|---|---|---|---|---|---|
| Template-free nano-Si-MFI after APTS grafting | <0.1 | 0.2 | 0.2 | 46.2 | — | — | 1.66 | — | 428 | 0.19 |
| Template-free PEG-nano-Si-MFI | 4.6 | 1.1 | 0.6 | 47.0 | — | — | 10.7 | — | 287 | 0.12 |
| Template-free IDZ-nano-Si-MFI | 4.7 | 1.0 | 1.8 | 46.6 | — | — | 8.36 | — | 283 | 0.11 |
| Template-free nano-SAPO-34 after APTS grafting | <0.1 | 0.6 | 0.2 | 6.52 | 21.4 | 19.7 | 4.77 | 0.2926 | 470 | 0.22 |
| Template-free PEG-nano-SAPO-34 | 4.0 | 1.4 | 0.4 | 8.52 | 20.8 | 18.5 | 10.5 | 0.3934 | 327 | 0.13 |
| Template-free IDZ-nano-SAPO-34 | 3.9 | 1.4 | 1.3 | 9.20 | 20.2 | 18.1 | 10.4 | 0.4374 | 331 | 0.13 |

Solid-state $^{29}$Si or $^{27}$Al NMR (for example, for PEG-nano-Si-MFI) and elemental analysis results (Table 5) demonstrated the successful grafting of PEG and IDZ on the molecular sieve framework silicon or aluminum atoms via covalent bonds. TEM images of the template-free PEG-nano-Si-MFI sample showed that its morphology is similar to that of template-free nano-Si-MFI.

The nitrogen gas sorption measurements (Table 5) show that both the BET surface to areas and the micropore volumes of the template-free nano-Si-MFI and nano-SA-PO-34 samples decrease from around 430 m$^2$/g (nano-Si-MFI) and around 470 m$^2$/g (nano-SAPO-34) to around 280 m$^2$/g and 330 m$^2$/g, respectively.

Mixed matrix membranes were fabricated by uniformly dispersing molecular sieve nanoparticles in a continuous polymer matrix. These mixed matrix membranes can be fabricated by dispersing the nano-molecular sieves or surface-functionalized nano-molecular sieves in a variety of polymer matrices.

A number of mixed matrix membranes were fabricated as follows: Mixed matrix dense films were prepared from a solution casting of template-free Si-MFI or SAPO-34 nanoparticles or template-free PEG-grafted (or IDZ-grafted) Si-MFI, AlPO-18, or SAPO-34 nanoparticles dispersed in 1,4-dioxane solution of cellulose acetate (CA) and cellulose triacetate (CTA) (1:1 weight ratio). The loading of the nano-molecular sieves in the mixed matrix dense films varied from 5 to 70 wt-%.

The thermal stability of the CA-based mixed matrix dense films was investigated by TGA. Results showed that all the dense films are thermally stable up to 250° C.

The glass transition temperatures ($T_g$) of the mixed matrix dense films were determined by DSC. $T_g$ provides a qualitative measure of the flexibility of polymers. It is a useful tool for comparisons of the polymer chain rigidity of mixed matrix films at various nano-zeolite loadings to that of pure polymer film. The $T_g$ for each film was determined from the heat flow versus temperature curve. $T_g$s of all the mixed matrix dense films containing PEG-nano-Si-MFI or IDZ-nano-Si-MFI with 10, 20, and 30 wt-% of loadings were slightly higher than that of the pure CA dense film. This $T_g$ elevation phenomenon was also observed in carbon molecular sieve-polyimide mixed matrix films (J. MEMBR. Sci., 2003, 211, 311). These results suggested that the presence of a dispersed nano-zeolite can affect the fundamental properties (e.g. $T_g$) of the polymer matrix phase when good segmental-level attachment exists between these two phases.

The permeabilities of $CO_2$ and $CH_4$ (P) and selectivity for $CO_2/CH_4$ ($\alpha_{CO2/CH4}$) of the nano-molecular sieve-CA mixed matrix dense membranes were measured by pure gas measurements at 50° C. under 690 kPa (100 psig) pressure. For all gases tested ($N_2$, $H_2$, $H_e$, $CO_2$ and $CH_4$), microporous PEG-nano-Si-MFI, PEG-nano-AlPO-18, PEG-nano-SAPO-34, and nano-SAPO-34 offered the favorable effect of dramatically increasing the permeability of the mixed matrix dense films over that of pure cellulose acetate dense film (Table 6). At the same time, the calculated ideal $\alpha_{CO2/CH4}$ remained almost the same or only slight decreased. $H_e$ permeation results of 30%-PEG-nano-Si-MFI-CA, 30%-PEG-nano-AlPO-18-CA, 30%-PEG-nano-SAPO-34-CA, and 30%-nano-SAPO-34-CA mixed matrix dense films confirmed that the intrinsic gas transport properties of PEG-nano-Si-MFI, PEG-nano-AlPO-18, PEG-nano-SAPO-34, and nano-SAPO-34 nano-molecular sieve and polymer matrix phases determine the effective high P of the mixed matrix dense films. For example, the $P_{CO2}$ of 30%-PEG-nano-Si-MFI-CA, 30%-PEG-nano-SAPO-34-CA, and 30%-nano-SAPO-34-CA mixed matrix dense films increased 78.7%, 14.9%, and 31.7% over that of CA dense film, respectively, and in the meantime the $\alpha_{CO2/CH4}$ remained almost the same as that of CA dense film.

In addition, the mechanical strength of the dense films with 30 wt-% nano-molecular sieve loading is still strong enough to hold 690 kPa (100 psig) testing pressure. These results indicate that nano-AlPO-18, nano-Si-MFI and nano-SAPO-34 are attractive additives for universally enhancing the gas permeability of CA membrane without sacrificing $\alpha_{CO2/CH4}$.

The principle behind the use of a mixed matrix membrane for $CO_2$ removal is to maximize the diffusivity selectivity ($D_{CO2}/D_{CH4}$) and/or solubility selectivity ($S_{CO2}/S_{CH4}$), so that improved $\alpha_{CO2/CH4}$ ($=P_{CO2}/P_{CH4}=(D_{CO2}/D_{CH4})\cdot(S_{CO2}/S_{CH4})$) can be achieved compared to the pure polymer membrane. It is worth noting from Table 7 that for both 30%-PEG-nano-Si-MFI-CA and 30%-nano-SAPO-34-CA mixed matrix dense films, the $D_{CO2}/D_{CH4}$ increased compared to that of pure CA dense film, indicating the intrinsic molecular sieving properties of nano-SAPO-34 and PEG-grafted nano-Si-MFI have played an important role for the performance of these mixed matrix dense films.

TABLE 6

Gas separation results of CA-based mixed matrix dense films*

| Film | Permeability (P, barrer) | | | | | | Selectivity ($\alpha_{CO2/CH4}$) |
|---|---|---|---|---|---|---|---|
| | $P_{CO2}$ | $P_{CO2}$ increased (%) | $P_{CH4}$ | $P_{He}$ | $P_{H2}$ | $P_{N2}$ | |
| Pure CA | 9.57 | — | 0.427 | 27.4 | 22.9 | 0.398 | 22.4 |
| 30%-PEG-nano-Si-MFI-CA | 17.1 | 78.7 | 0.861 | 39.0 | 34.9 | 0.792 | 19.9 |
| 20%-IDZ-nano-Si-MFI-CA | 10.7 | 11.8 | 0.506 | 31.8 | 26.7 | — | 21.1 |
| 20%-PEG-nano-AlPO-18 | 12.6 | 3.7 | 0.545 | — | — | — | 23.1 |
| 30%-nano-SAPO-34 | 12.6 | 31.7 | 0.598 | 35.8 | 29.4 | 0.572 | 21.1 |
| 30%-PEG-nano-SAPO-34-CA | 11.0 | 14.9 | 0.509 | 33.4 | 27.6 | — | 21.6 |
| 30%-IDZ-nano-SAPO-34-CA | 11.3 | 18.1 | 0.538 | 33.8 | 27.9 | — | 21.0 |

*Testing conditions: Pure gas permeation, 50° C., 690 kPa (100 psig); 1 barrer = $10^{-10}$ cm$^3$(STP) · cm/cm$^2$ · sec · cmHg.

TABLE 7

Gas separation results of nano-zeolite-CA mixed matrix dense films*

| Film | Solubility (S, $10^{-2}$ $cm^3(STP)/cm^3$ (polymer)) | | Diffusivity (D, $10^{-8}$ $cm^2/sec$) | | Permeability (P, barrer) | |
|---|---|---|---|---|---|---|
| | $S_{CO2}$ | $S_{CH4}$ | $D_{CO2}$ | $D_{CH4}$ | $P_{CO2}$ | $P_{CH4}$ |
| Pure CA | 3.97 | 0.500 | 2.41 | 0.853 | 9.57 | 0.427 |
| 30%-PEG-nano-Si-MFI-CA | 4.36 | 1.20 | 3.91 | 0.715 | 17.1 | 0.861 |
| 30%-nano-SAPO-34 | 4.33 | 0.735 | 2.91 | 0.814 | 12.6 | 0.598 |

*Testing conditions: Pure gas permeation, 50° C., 690 kPa (100 psig); 1 barrer = $10^{-10}$ $cm^3(STP) \cdot cm/cm^2 \cdot sec \cdot cmHg$.

EXAMPLES

The present invention will be better understood with reference to the following non-limiting inventions.

Example 1

Preparation of Template-Containing Nano-Si-MFI

The synthesis of colloidal template-containing Si-MFI nanoparticles was prepared in accordance with Navrotsky, et al., CHEM. MATER., 16:210 (2004) and references thereof. A precursor solution with the composition of 9:25:480:100 TPAOH:TEOS:$H_2O$:$C_2H_5OH$ was prepared using tetrapropylammonium hydroxide solution (TPAOH: Alfa, 40%), tetraethyl orthosilicate (TEOS: Alfa, 99.9%), and deionized (DI) water. 30.32 g of 40% TPAOH solution and 68.40 g of TEOS were mixed under vigorous stirring at room temperature. The TEOS phase and the aqueous TPAOH solution were initially not completely miscible and formed an emulsion-like mixture under stirring. After about 2-3 hours of reaction while stirring, the mixture became a homogeneous and completely clear solution. After about 6 hours of stirring, the clear precursor solution was digested quiescently at 80° to 90° C. for 48 hours in a Teflon® bottle. After digestion, a sol of 100 nm, crystalline, Si-MFI nanoparticles was obtained. The sol had a pH of 12.5 to 13.5. In order to remove anionic species from the "raw" silicalite sols, they were contacted with an anion exchange resin in the base (OH) form. The silicalite sols were contacted with an amount of dry anion exchange resin roughly equal to half their weight (most commonly 500 g anion exchange resin for a 1 L batch of silicalite sol). Prior to contact, the dry resin was soaked in enough DI water to be covered completely for 30 minutes. Contact between the sol and the wet resin was for 1 hour in a large plastic beaker with stirring by a low-shear agitator. After contact, the solids were screened from the sol with a 60-mesh screen, and the ion exchange beads were rinsed with an amount of DI water roughly equal to half the volume of raw sol. The rinse was collected along with the anion-exchanged silicalite sol. Cationic species were removed from the silicalite sols by contact of the anion-exchanged sols with cation exchange resin in the acid (H) form. Again, the anion-exchanged sols were contacted with an amount of dry cation exchange resin roughly equal to half the weight of raw sol, and the same procedure was used to soak the dry resin. Prior to contact, both the wet resin and the anion-exchanged sols were cooled in an ice bath to 0° to 10° C. As before, contact between the sol and the wet resin was accomplished in a large plastic beaker with stirring by a low-shear agitator. However, the contact was carried out in an ice bath in order to maintain a temperature of 0° to 10° C. Contact continued until the pH of the slurry reached 9.25 to 10.0, as measured in-situ by a pH probe. After contact, the solids were screened from the sol with a 60-mesh screen and rinsed quickly with cold (0° to 10° C.) DI water. The amount of rinse water was equal to that used in the anion exchange step, and the rinse was again collected with the cation-exchanged sol.

Example 2

Preparation of Template-Containing Nano-SAPO-34

167.62 g of tetraethylammonium hydroxide solution (TEAOH) (35 wt-% in water) and 16.95 g of Ludox AS40 silica were mixed well in a beaker and then transferred to a Teflon bottle. The Teflon bottle was placed in 100° C. oven to dissolve the silica. The Teflon bottle was taken out from the oven and cooled to room temperature. 118.17 g of free DI water was added into a separate beaker, and then 91.95 g of $H_3PO_4$ (85 wt-% in water) was added while stirring. The TEAOH/silica solution was then added to the $H_3PO_4$ solution while stirring. 55.31 g of Versal 250 was added to the mixture and mixed with a Heidolph mixer for 20 min. The gel (pH=2.35) was then transferred to a 0.6 L stirred reactor. The reactor was ramped over 5 hours to 100° C. and held at 100° C. for 9 hours. The reaction was then ramped over 5 hours to 175° C. and held at 175° C. for 48 hours. The solid was then collected by centrifugation and washed with water.

Example 3

Preparation of Template-Free Nano-Si-MFI

The as-synthesized template-containing nano-Si-MFI slurry in $H_2O$ (~5.5 wt-% solid, pH=10, 90 nm particle size) was then diluted with water in order to adjust the concentration to 4 wt-%. The outside surface of the template-containing Si-MFI nanoparticles was functionalized by reaction with an ethanol solution of aminopropyltriethoxysilane ("APTS", $H_2N(CH_2)_3Si(OC_2H_5)_3$) in a 4-fold excess relative to the amount of APTS needed for full surface coverage on the particles. The APTS organic reagent:Si-MFI particle ratio was fixed at 1 mmol/g. After the reaction, the excess of APTS reagent was eliminated by repeated centrifugation (10000 rpm) and re-dispersion in ethanol and then water by ultrasonication. The recovered template-containing solid was dried at 80° to 90° C. overnight and calcinated at 550° C. for 6 hours under air (heating rate 2° C./min) to form template-free nano-Si-MFI.

Example 4

Preparation of Template-Free Nano-SAPO-34

Template-free nano-SAPO-34 was synthesized by dispersing the as-synthesized template-containing SAPO-34 nanoparticles in water at a concentration of 4 wt-%. The outside surface of the template-containing SAPO-34 nanoparticles was functionalized by reaction with an ethanol solution of aminopropyltriethoxysilane (APTS, $H_2N(CH_2)_3Si(OC_2H_5)_3$) in a 4-fold excess relative to the amount of APTS needed for full surface coverage on the particles. The APTS organic reagent:SAPO-34 particle ratio was fixed at 1 mmol/g. After the reaction, the excess of APTS reagent was eliminated by repeated centrifugation (10000 rpm) and re-dispersion in ethanol and then in water by ultrasonication. The recovered template-containing solid was dried at 80° to 90° C. overnight and calcinated at 550° C. for 6 hours under air (heating rate 2° C./min) to form template-free nano-SAPO-34.

Example 5

Preparation of Template-Free Poly(Ethylene Glycol) (PEG)-Grafted Nano-Si-MFI (PEG-Nano-Si-MFI)

4.0 g of template-free nano-Si-MFI prepared by organic ligand grafting method was re-dispersed in 105 g of ethanol by ultrasonication and stirring to form a homogeneous slurry. Template-free Si-MFI nanoparticles were modified by treatment with an organosilane coupling agent, N-(triethoxysilyl-propyl)-O-polyethylene oxide urethane (PEGTS). The PEGTS/Si-MFI ratio was fixed at 1.5 mmol/g. 2.7 g of PEGTS was added to the Si-MFI nanoparticle suspension, and then 5.5 g of water was added (water:ethanol=5:95 (wt-%)). The suspension was stirred at room temperature for 4 days. After reaction, the excess of PEGTS and its oligomer was eliminated by repeated centrifugation (10,000 rpm) and re-dispersion in ethanol by ultrasonication. The recovered solid was dried at 85° to 90° C. for 2 days.

Example 6

Preparation of Template-Free PEG-Grafted Nano-SAPO-34 (PEG-Nano-SAPO-34)

The PEG-nano-SAPO-34 was synthesized following the procedure for PEG-nano-Si-MFI except using template-free nano-SAPO-34 prepared by organic ligand grafting method instead of using template-free nano-Si-MFI prepared by organic ligand grafting method.

Example 7

Preparation of Template-Free Imidazole-Grafted Nano-Si-MFI (IDZ-Nano-Si-MFI)

4.0 g of template-free nano-Si-MFI prepared by organic ligand grafting method was re-dispersed in 107.8 g of ethanol by ultrasonication and stirring to form homogeneous slurry. Template-free Si-MFI nanoparticles were modified by treatment with an organosilane coupling agent, N-(3-triethoxysi-lylpropyl)-4,5-dihydroimidazole (IDZTS). The IDZTS/Si-MFI ratio was fixed at 1.5 mmol/g. 1.65 g of IDZTS was added to the Si-MFI nanoparticle suspension, and then 5.67 g of water was added (water:ethanol=5:95 (wt-%)). The suspension was stirred at room temperature for 4 days. After reaction, the excess of IDZTS and its oligomer was eliminated by repeated centrifugation (10,000 rpm) and re-dispersion in ethanol by ultrasonication. The recovered solid was dried at 85° to 90° C. for 2 days.

Example 8

Preparation of Template-Free Imidazole-Grafted Nano-SAPO-34 (IDZ-Nano-SAPO-34)

The IDZ-nano-SAPO-34 was synthesized following procedure for IDZ-nano-Si-MFI using template-free nano-SAPO-34 prepared by organic ligand grafting method instead of using template-free nano-Si-MFI prepared by organic ligand grafting method.

Example 9

Preparation of Template-Free Nano-Molecular Sieve-Ca and Surface-Functionalized Template-Free Nano-Molecular Sieve-CA Mixed Matrix Dense Films Mixed matrix dense films were prepared by solution casting a polymer solution containing dispersed template-free nano-molecular sieves or surface-functionalized template-free nano-molecular sieves. Cellulose acetate (CA) and cellulose triacetate (CTA) polymers with 1:1 weight ratio were dissolved in 1,4-dioxane solvent at room temperature for 12 h to form a 2 wt-% CA solution. A measured amount of dry template-free nano-molecular sieves was then added, and the resulting slurry was stirred and ultrasonicated for three times to ensure good dispersion of the template-free molecular sieves. The CA solutions with template-free nano-molecular sieves loadings of 0, 10, 20, 30, 40, and 50 wt-% (based on weight of CA+CTA) were poured into a glass ring on top of a clean glass plate, and dried at room temperature for 24 hours. The resulting dried mixed matrix dense films were detached from the glass plate and were further dried at room temperature for at least 48 hours and then at 110° C. for at least 24 hours under vacuum. The dense films were around 2 to 3 mils thick, measured with a micrometer. They were cut into small circles for gas separation measurements using a dense film test unit.

The invention claimed is:

1. A method of manufacturing a membrane comprising:
   (a) selecting a quantity of one or more types of template-containing nano-molecular sieve particles;
   (b) functionalizing template-containing nano-molecular sieve particles by an organic ligand-grafting-calcination-organic ligand-grafting method so as to obtain functionalized template-free nano-molecular sieve particles;
   (c) forming a mixture by mixing 5 to 70 wt-% of said functionalized template-free nano-molecular sieve particles with a polymer; and
   (d) casting a membrane from said mixture.

2. The method of claim 1 wherein said nano-molecular sieve particles have a particle size from 5 to 1000 nm.

3. The method of claim 1 wherein said nano-molecular sieve particles are selected from the group consisting of Si-MFI, SAPO-34, Si-MTW, Si-BEA, Si-MEL, LTA, FAU, Si-DDR, AlPO-14, AlPO-34, AlPO-18, AlPO-25, AlPO-5, SSZ-62, SSZ-13, UZM-9, UZM-25, CDS-1, MCM-65, Nu-6(2), and mixtures thereof.

4. The method of claim 1 wherein said polymer comprises at least one polymer selected from the group consisting of substituted and unsubstituted polymers and may be selected from polysulfones; poly(styrenes), including styrene-containing copolymers comprising acrylonitrilestyrene copolymers, styrene-butadiene copolymers and styrene-vinylbenzylhalide copolymers; polycarbonates; cellulosic polymers, comprising cellulose acetate-butyrate, cellulose propionate, ethyl cellulose, methyl cellulose, nitrocellulose; polyamides and polyimides, including aryl polyamides and aryl polyimides; polyethers; polyetherimides; polyetherketones; poly(arylene oxides) comprising poly(phenylene oxide) and poly(xylene oxide); poly(esteramide-diisocyanate); polyurethanes; polyesters (including polyarylates), comprising poly(ethylene terephthalate), poly(alkyl methacrylates), poly(acrylates), poly(phenylene terephthalate); polypyrrolones; polysulfides; polymers from monomers having alpha-olefinic unsaturation other than mentioned above comprising poly (ethylene), poly(propylene), poly(butene-1), poly(4-methyl pentene-1), polyvinyls comprising poly(vinyl chloride), poly(vinyl fluoride), poly(vinylidene chloride), poly(vinylidene fluoride), poly(vinyl alcohol), poly(vinyl esters) comprising poly(vinyl acetate) and poly(vinyl propionate), poly(vinyl pyridines), poly(vinyl pyrrolidones), poly(vinyl ethers), poly(vinyl ketones), poly(vinyl aldehydes) comprising poly(vinyl formal) and poly(vinyl butyral), poly(vinyl amides), poly(vinyl amines), poly(vinyl urethanes), poly(vinyl ureas), poly(vinyl phosphonates), and poly(vinyl sulfonates); polyallyls; poly(benzobenzimidazole); polyhydrazides; polyoxadiazoles; polytriazoles; poly(benzimidazole); polycarbodiimides; polyphosphazines; and interpolymers, including block interpolymers containing repeating units from the above comprising terpolymers of acrylonitrile-vinyl bromide-sodium salt of para-sulfophenylmethallyl ethers; and grafts and blends containing any of the foregoing, wherein typical substituents providing substituted polymers include halogens comprising fluorine, chlorine and bromine; hydroxyl groups; lower alkyl groups; lower alkoxy groups; monocyclic aryl; and lower acid groups.

5. The method of claim 1 wherein said polymer comprises at least one polymer selected from the group consisting of cellulose acetate, cellulose triacetate, polysulfone, polyethersulfone, polyimide, polyetherimide, polyamide, cellulose nitrate, polyurethane, polycarbonate, and polystyrene.

6. The method of claim 1 wherein said functionalizing template-free nano-molecular sieve particles comprises grafting functional organic linkages on a surface of said nano-molecular sieve particles.

7. The method of claim 6 wherein said functional organic linkage is an organosilane.

8. The method of claim 7 wherein said functional organosilane linkage is a compound having the formula $R(CH_2)_nSi(OR_1)_3$ in which R is a functional group selected from the group consisting of 4,5-dihydroimidazole, poly(ethylene glycol), SH, $NH_2$, C≡N, O=C=N, OH, $NH(CH_2)_2NH_2$, $OCH_2CH(OH)CH_2N(CH_2CH_2OH)_2$, calix[n]arenes (n=4, 6, or 8), or R is an ionic group selected from the group consisting of $N^+CH_3((CH_2)_9CH_3)_2Cl^-$, $N^+((CH_2)_{17}CH_3)(CH_3)_2Cl$, $N^+(CH_3)_3Cl^-$, $N^+(CH_2CH_3)_3Cl^-$, $N^+(CH_2CH_2CH_2CH_3)_3Cl^-$ and other trialkyl ammonium groups, n is an integer from 1 to 20, and $R_1$ is a $C_1$-$C_8$ hydrocarbon group.

9. The method of claim 7 wherein said functional organic linkage is a compound having the formula $R(CH_2)_nSiR'(OR^1)_2$ in which R is an organic functional group selected from the group consisting of 4,5-dihydroimidazole, poly(ethylene glycol), SH, $NH_2$, C≡N, O=C=N, OH, $NH(CH_2)_2NH_2$, $OCH_2CH(OH)CH_2N(CH_2CH_2OH)_2$, calix[n]arenes (n=4, 6, or 8), or R is an ionic group selected from the group consisting of $N^+CH_3((CH_2)_9CH_3)_2Cl^-$, $N^+((CH_2)_{17}CH_3)(CH_3)_2Cl$, $N^+(CH_3)_3Cl^-$, $N^+(CH_2CH_3)_3Cl^-$, $N^+(CH_2CH_2CH_2CH_3)_3Cl^-$ and other trialkyl ammonium groups, n is an integer from 1 to 20, $R_1$ is a $C_1$-$C_8$ hydrocarbon group, and R' is a $C_1$-$C_8$ hydrocarbon group.

10. The method of claim 7 wherein said functional organic linkage is a compound having the formula $R(CH_2)_nSiR'(R'')(OR_1)$ in which R is an organic functional group selected from the group consisting of 4,5-dihydroimidazole, poly(ethylene glycol), SH, $NH_2$, C≡N, O=C=N, OH, $NH(CH_2)_2NH_2$, $OCH_2CH(OH)CH_2N(CH_2CH_2OH)_2$, calix[n]arenes (n=4, 6, or 8), or R is an ionic group selected from the group consisting of $N^+CH_3((CH_2)_9CH_3)_2Cl^-$, $N^+((CH_2)_{17}CH_3)(CH_3)_2Cl^-$, $N^+(CH_3)_3Cl^-$, $N^+(CH_2CH_3)_3Cl^-$, $N^+(CH_2CH_2CH_2CH_3)_3Cl^-$ and other trialkyl ammonium groups, n is an integer from 1 to 20, $R_1$ is a $C_1$-$C_8$ hydrocarbon group, R' is a $C_1$-$C_8$ hydrocarbon group, and R" is a $C_1$-$C_8$ hydrocarbon group.

11. The method of claim 1 wherein said nano-molecular sieve initially contains a structure-directing template and wherein after the grafting of said functional group to said nano-molecular sieve, said structure-directing template is removed from said nano-molecular sieve by calcination.

12. The method of claim 11 further comprising a second grafting step wherein following said calcination, a second organosilane compound is grafted to said calcinated nano-molecular sieve to form functionalized template-free molecular sieve nanoparticles.

13. The method of claim 12 wherein said second organosilane comprises a compound having the formula $R_2(CH_2)_mSi(OR_3)_3$ wherein $R_2$ is a functional group selected from the group consisting of 4,5-dihydroimidazole, poly(ethylene glycol), SH, $NH_2$, C≡N, O=C=N, OH, $NH(CH_2)_2NH_2$, $OCH_2CH(OH)CH_2N(CH_2CH_2OH)_2$, calix[n]arenes (n=4, 6, or 8), or R an ionic group selected from the group consisting of $N^+CH_3((CH_2)_9CH_3)_2Cl^-$, $N^+((CH_2)_{17}CH_3)(CH_3)_2Cl$, $N^+(CH_3)_3Cl^-$, $N^+(CH_2CH_3)_3Cl^-$, $N^+(CH_2CH_2CH_2CH_3)_3Cl^-$ and other trialkyl ammonium groups, m is an integer from 1 to 20, and $R_3$ is a $C_1$-$C_8$ hydrocarbon group, and R, $R_1$, $R_2$, $R_3$, m, n are each independent.

14. The method of claim 12 wherein said second organosilane comprises a compound having the formula $R(CH_2)_nSiR'(OR^1)_2$ in which R is an organic functional group selected from the group consisting of 4,5-dihydroimidazole, poly(ethylene glycol), SH, $NH_2$, C≡N, O=C=N, OH, $NH(CH_2)_2NH_2$, $OCH_2CH(OH)CH_2N(CH_2CH_2OH)_2$, calix[n]arenes (n=4, 6, or 8), or R is an ionic group selected from the group consisting of $N^+CH_3((CH_2)_9CH_3)_2Cl^-$, $N^+((CH_2)_{17}CH_3)(CH_3)_2Cl$, $N^+(CH_3)_3Cl^-$, $N^+(CH_2CH_3)_3Cl^-$, $N^+(CH_2CH_2CH_2CH_3)_3Cl^-$ and other trialkyl ammonium groups, n is an integer from 1 to 20, $R_1$ is a $C_1$-$C_8$ hydrocarbon group, and R' is a $C_1$-$C_8$ hydrocarbon group.

15. The method of claim 12 wherein said second organosilane comprises a compound having the formula $R(CH_2)_nSiR'(R'')(OR_1)$ in which R is an organic functional group selected from the group consisting of 4,5-dihydroimidazole, poly(ethylene glycol), SH, $NH_2$, C≡N, O=C=N, OH, $NH(CH_2)_2NH_2$, $OCH_2CH(OH)CH_2N(CH_2CH_2OH)_2$, calix[n]arenes (n=4, 6, or 8), or R is an ionic group selected from the group consisting of $N^+CH_3((CH_2)_9CH_3)_2Cl^-$, $N^+((CH_2)_{17}CH_3)(CH_3)_2Cl$, $N^+(CH_3)_3Cl^-$, $N^+(CH_2CH_3)_3Cl^-$, $N^+(CH_2CH_2CH_2CH_3)_3Cl^-$ and other trialkyl ammonium groups, n is an integer from 1 to 20, $R_1$ is a $C_1$-$C_8$ hydrocarbon group, R' is a $C_1$-$C_8$ hydrocarbon group, and R" is a $C_1$-$C_8$ hydrocarbon group.

16. The method of claim 12 wherein said functionalized template-free molecular sieve nanoparticles are dispersible in organic solvents.

17. A mixed matrix membrane made by the method of claim 1.

* * * * *